United States Patent [19]
Fatseas et al.

[11] Patent Number: 5,671,409
[45] Date of Patent: Sep. 23, 1997

[54] COMPUTER-AIDED INTERACTIVE CAREER SEARCH SYSTEM

[76] Inventors: Ted Fatseas; Amy E. Fatseas, both of 1244 Orkney La., Cardiff, Calif. 92007; Peter Kreklow, 249 S. Hwy 101, Solano Beach, Calif. 92075; John E. George, 4321 Goldfinch St., San Diego, Calif. 92103

[21] Appl. No.: 388,365

[22] Filed: Feb. 14, 1995

[51] Int. Cl.⁶ .................................................. G06F 13/42
[52] U.S. Cl. .................. 395/615; 395/201; 434/219
[58] Field of Search ......................... 395/600, 615, 395/201; 364/419.01, 419.02; 360/12; 434/219

[56] References Cited

U.S. PATENT DOCUMENTS 4,389,679  6/1983  Missan et al. ............................ 360/12

OTHER PUBLICATIONS

K. Baiser; *Interactive Exploration Tools*; Database, vol. 16, No. 4, Aug. 1993, pp. 92–94.

C. Holzberg; *Take Charge*; CD-ROM World, vol. 9, No. 7, Jul./Aug. 94, pp. 56–58.

V. Hanson, C. Padden; *HandsOn: A Multi-Media Program for Bilingual Language Instruction of Deaf Children*; IEEE 1992 Proceedings of the Johns Hopkins National Search for Computing Applications to Assist Persons With Disabilities, Jan. 1992, pp. 5–6.

Spohrer et al. "A role playing simulator for needs analysis consulations" The World Congress on Expert Systems, pp. 2828–2839, Vol. 4 Jan. 1991.

Arthur et al. "Role'm—A role–play simulation" Apple Computer, pp. 1–36 Jul. 1993.

*Primary Examiner*—Thomas G. Black
*Assistant Examiner*—Jean M. Corrielus
*Attorney, Agent, or Firm*—Trask,Britt & Rossa

[57] ABSTRACT

A method for accessing career information located in a computer database through interactive CD-ROM technology or other suitable computer-accessible means. The method involves the use of several levels of inquiry from which a user can select various careers, and for each career ask specific questions. The answers to these questions can be answered through digitized speech and video enactments of a person employed in a particular career field, or through text displayed on a computer screen. The textual material contained in the database can be printed through an attached printer. The user may also operate the method in various selectable languages.

20 Claims, 7 Drawing Sheets

Commercial Photographer

SELECT A QUESTION

- ☐ What education does your job require?
- ☐ What college did you attend?
- ☐ What is your salary range?
- ☐ Do you enjoy your job?
- ☐ What is your workday like?
- ☐ How many hours a day do you spend at work?
- ☐ How much vacation time do you get per year?
- ☐ What are the positive aspects of your job?
- ☐ More Questions......

O.O.H Forecast
Commercial Photography Market outlook for commercial photography looks extremely good for the next decade and beyond.
High growth areas exist in fashion, sports and industrial photography. This is Print Marshall Harrington...
Commercial Photographer

[ English ]  [ Espanol ]  [ Reference ]  [ Main Menu ]

COMPUTER-AIDED INTERACTIVE CAREER SEARCH SYSTEM

BACKGROUND

1. Field of the Invention

This invention relates generally to computer-based information systems, and, more particularly, to a computer-aided interactive system that provides a user with information about various career opportunities. The invention further relates to a method of using such an interactive computer-based system.

2. Statement of the Art

There is a long-recognized benefit to school-aged children and young adults in providing information relating to various career and occupations to enable them to direct their future academic studies toward obtaining a particular career or occupational position. It is also recognized that career and occupational information is useful to older adults who wish to pursue a new or different career from one in which they have previously been employed.

Presently, in order to investigate various careers or occupations, one must either manually search and read through numerous publications, or find and question someone working in a particular field of interest. This is true whether the person conducting the search is on the junior high, high school or college level, or is presently employed. A manual search of this type is very difficult to organize, particularly if a number of different careers are of interest to an individual, and the task is very time-consuming. Moreover, reading a periodical, for example, about a particular career lacks personal interaction and provides no means for asking pertinent questions about the particular career or occupation.

At the same time, there has been a tremendous increase in the availability and use of personal computers in the last fifteen years which has effectively put a wealth of information readily at one's fingertips. Additionally, CD-ROM technology is increasingly becoming a vital part of most personal computer systems because of its data storage capacity and quick data accessibility. CD-ROM has provided a medium for software applications that were impractical or impossible before. Complex and detailed graphic-based programs, such as games, are made increasingly possible because of CD-ROM technology. Thus, many new programs which are only available on compact disc have evolved as a result.

Because of its inherent qualities, one of the first and most notable uses of CD-ROM technology for personal computers involved encyclopedia applications. Due to its ability to store large mounts of information, several encyclopedia volumes can be stored on a single compact disc. In addition, due to its ability to quickly access information, CD-ROM technology has made it possible to include visual and audio effects that can be accessed and presented along with the encyclopedia text to enhance the computer environment for a user.

Thus, it would be advantageous to provide a computer-aided interactive means for researching career opportunities which permits the user to selectively access a compilation of information relating to one or more careers or occupations. It would further be advantageous to employ the technology of CD-ROM to facilitate such interactive researching.

SUMMARY OF THE INVENTION

In accordance with the present invention, computer-aided interactive means are provided for selectively accessing a compilation of information relating to one or more careers which is structured to facilitate self-directed and individualized searching of career and occupational opportunities. The interactive means of the present invention may be provided in any suitable computer-accessible format, including CD-ROM, and means are provided for downloading and printing career information from the system at the user's command to enable the user to memorialize the search results. The interactive means of the present invention is also structured to provide access to a single compilation of information in a variety of languages, including American Sign Language (ASL), thereby enabling its use by other than English-speaking persons.

The interactive means of the present invention comprises a computer-based system which contains a compilation of information relating to one or more careers. The information may be compiled in a database contained in a suitably structured software program. Alternatively, the information may be compiled on one or more CD-ROM discs and may be accessible by conventional means relating to CD-ROM. Alternative vehicles for accessing or providing interactive means for exploring career opportunities include on-line services, network services, direct TV, direct satellite and cable accessible resources.

The data may be compiled from various sources, including written information from, for example, government sources or public libraries. In a preferred embodiment, the information presented in the interactive means is derived from interviews of persons employed in a variety of careers. The interactive means presents to the user a means for selectively accessing the compiled information in a manner which allows the user to define his or her own research parameters. That is, the user may move through multiple levels of inquiry structured within the interactive means, and may, within a particular level of inquiry, selectively access a variety of information specifically responsive to the user's research needs.

The user initiates the interactive means through appropriate hardware structure. The user is provided with a means for selectively directing his research in a particular searchable field relating generally to careers. Thus, for example, the user may initiate his search in career opportunities by selecting from a menu of field identifiers. Examples of field identifiers may be "careers by geographical location," "careers by educational requirement," "careers by average yearly income," "careers by subject," and the like. Within any field identifier there may be a secondary, tertiary, quaternary, or further levels of sub-field identifiers to select from. For example, within the field identifier of "careers by geographical location," there may be secondary sub-field identifiers such as "careers in the Southern United States," "careers in the outdoors," "careers relating to water resources," and the like.

In a preferred embodiment, the information compiled relating to a specific career may be derived from interviews of persons employed in that career or occupation. Alternatively, live interviews may be staged using actors who are prepared to answer specific questions, the answers to which are derived from written text resources, such as government-generated data on occupations. In another alternative means, animation may be employed to present computer-generated "people" who serve as interviewees. Animation provides the opportunity to introduce special characterization to the interviews which may appeal more readily to younger users.

Upon selection of a particular career file, the user is provided with a menu of questions which were propounded to the interviewee. The questions propounded to each interviewee in any career or occupation may typically be the same. Thus, for example, the user of the interactive means of the present invention may inquire, "What education does your job require?", "What type of training is required for your job?", "What is your salary range?", and the like. The user may select one or more questions to be answered relating to a specific career. The user may then select another career or occupation, and may select for answering the same one or more questions. By doing so, the user may then compare the response to a single question propounded with respect to two or more career.

The method of the invention using interactive computer-aided or CD-ROM technology to selectively access information relating to one or more career facilitates self-directed and individualized searching of career opportunities. The method can thus be tailored to meet the unique inquiries and needs of the individual user. Further, the interactive means of the present invention is structured to provide the compiled information on career and occupational opportunities in one or more languages, such as English and Spanish, which permits the same system to be used by persons who are functional in English and/or other languages. Information provided in interview formats may also be available in American Sign Language. The ability to access the same information in a variety of languages provides the added advantage of acclimating non-English speaking persons to the type of issues or language which may be raised in a job interview with an English-speaking employer.

Still other objects and advantages of the invention will become readily apparent to those skilled in the art from the following detailed description, wherein the structure and method illustrated herein are described. As will be realized, the invention is capable of other and different embodiments, and its elements are capable of modifications in various respects, all without departing from the invention. Accordingly, the drawings and description are to be regarded as illustrative in nature, and not as restrictive.

BRIEF DESCRIPTION OF THE DRAWINGS

In the drawings, which illustrate what is currently considered to be the best mode for carrying out the invention.

DETAILED DESCRIPTION OF THE PREFERRED EMBODIMENTS

The interactive means of the present invention may be carried out in any suitable computer-aided software and hardware means. However, the use of CD-ROM technology to provide the interactive career search program of the present invention is described as an exemplar means of carrying out the invention. The program allows a user to access information on specific careers and interact with persons employed in those fields. The user can also access specific information within each career choice through a list of provided questions.

Figure 1:
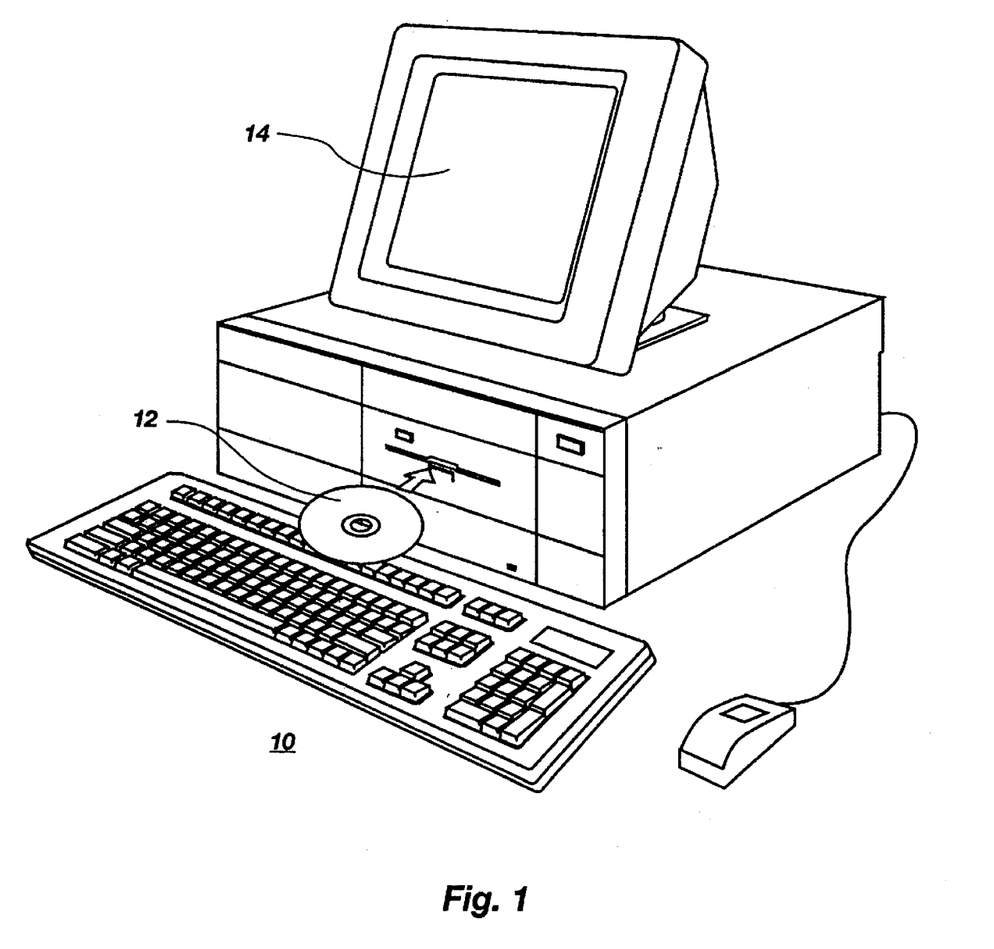
FIG. 1 is an isometric view of a personal computer.

As shown in FIG. 1, the method of accessing career information effectively begins when the user chooses a compact disc 12 on which is encoded by conventional means information relating to one or more career or occupations.

Figure 2:
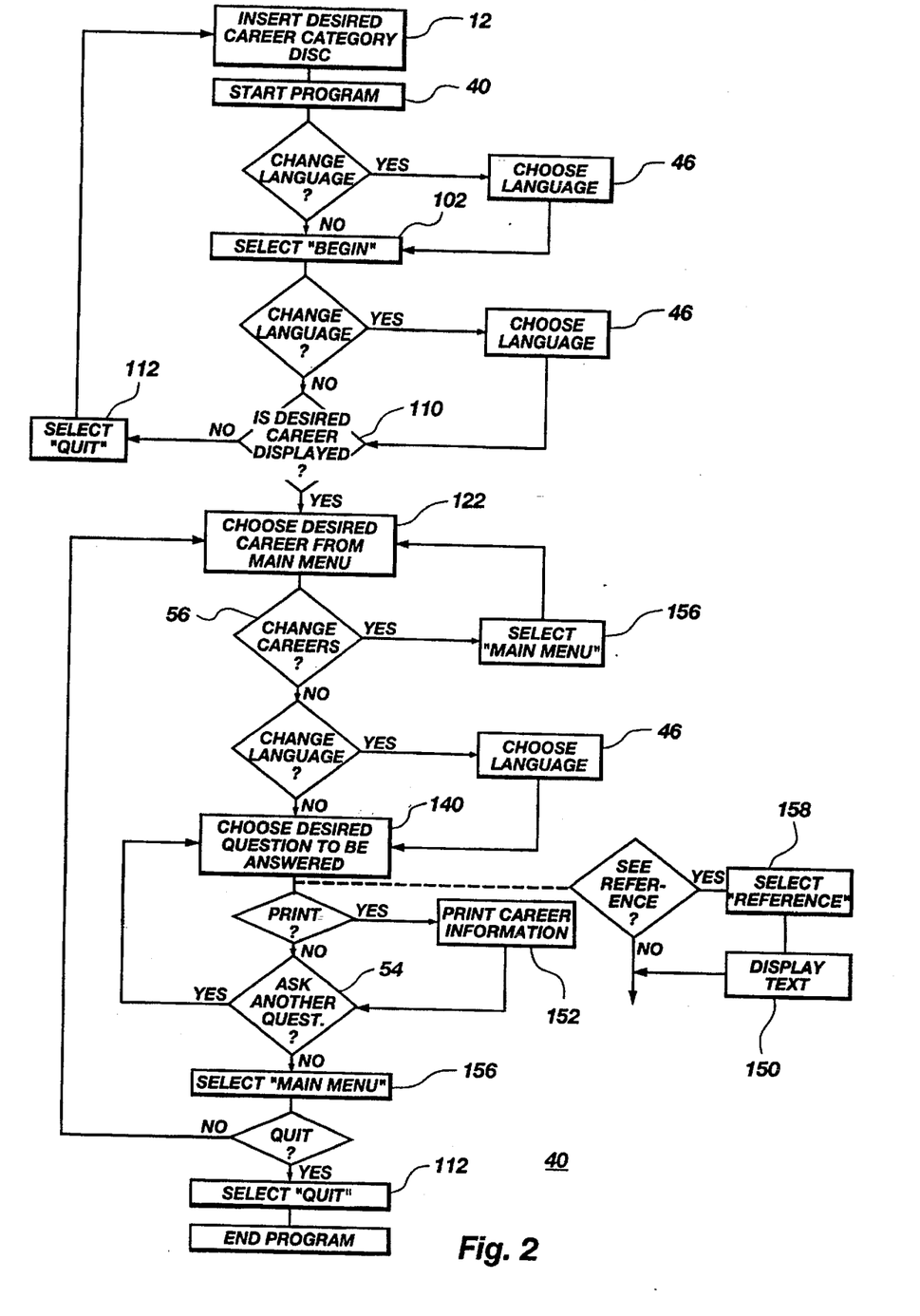
FIG. 2 is a flow diagram representing the accessing of information by the interactive means of the present invention.
Figure 3A:
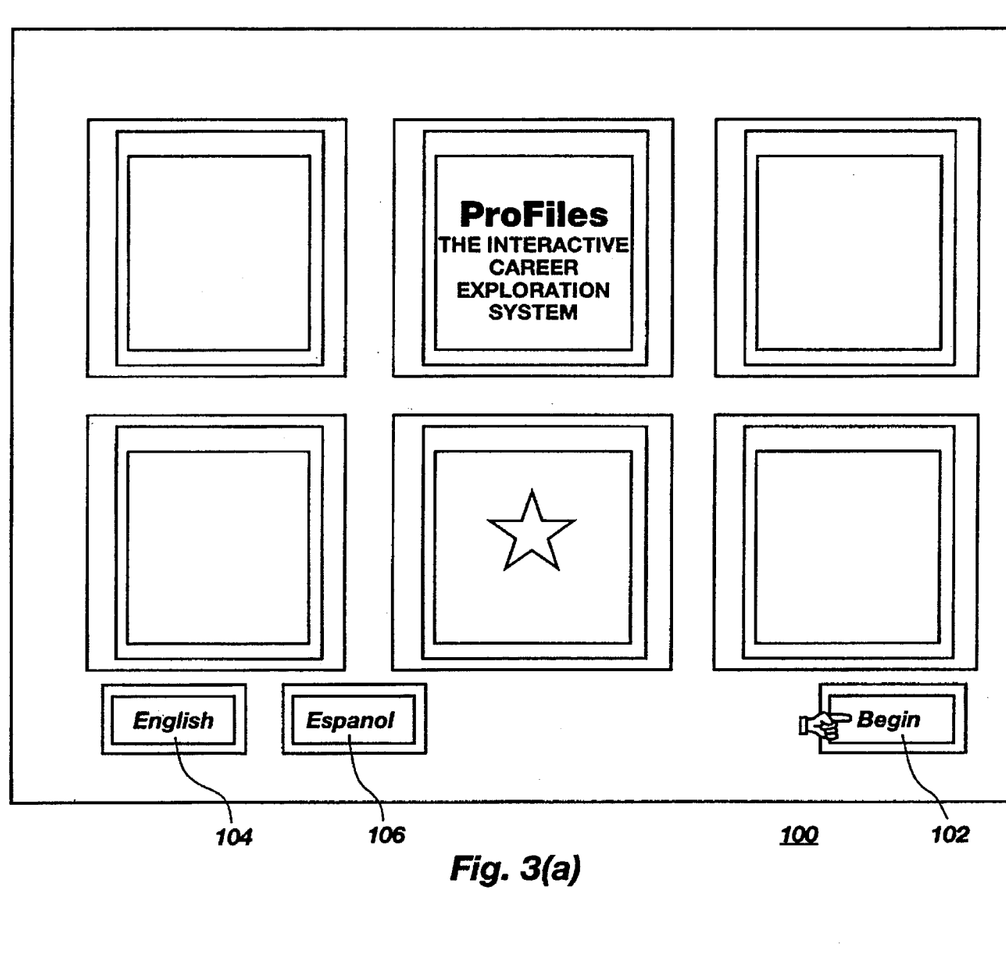
FIGS. 3(a)-3(e) are representations of various computer screens viewable during operation of the program.
Figure 3B:
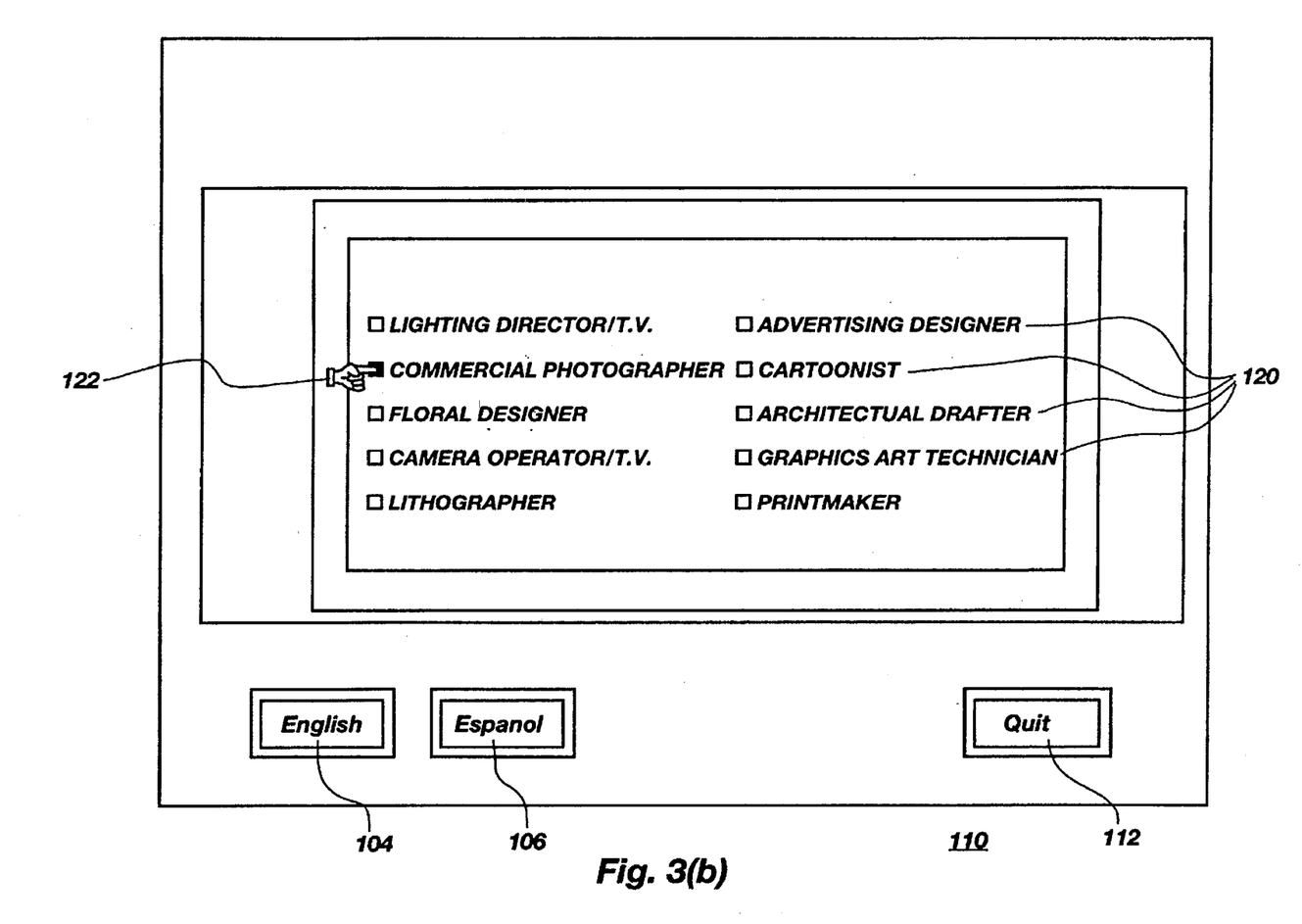

The information on any single disc 12 may be organized and encoded in any suitable manner and, for example, may contain career information relating to a particular field of interest or to a particular level of education, or the like. Once the main program, as diagrammed in FIG. 2, is accessed, the monitor 14 of the computer 10 will display the start-up screen 100 as shown in FIG. 3(a). The selections which appear on the green for accessing the encoded information may be selected by use of a mouse or cursor clicked on the appropriate portion of the screen, or by other means known in the art. As shown in FIGS. 2 and 3(a), the user may select "Begin" 102 to start the program 40. Once started, the program 40 accesses information encoded in the disc 12 which causes to be displayed a career menu screen 110 identifying those careers 120 contained on that particular disc 12, as shown in FIG. 3(b). For example, if a user is interested in an "art-skilled" career, the user may select and insert a disc 12 containing numerous accessible sub-files, each sub-file containing information concerning a career relating to the arts. The program first displays a menu comprising a first level of inquiry providing selection of those careers 120 which are encoded in the sub-files on that disc 12.

Figure 3C:
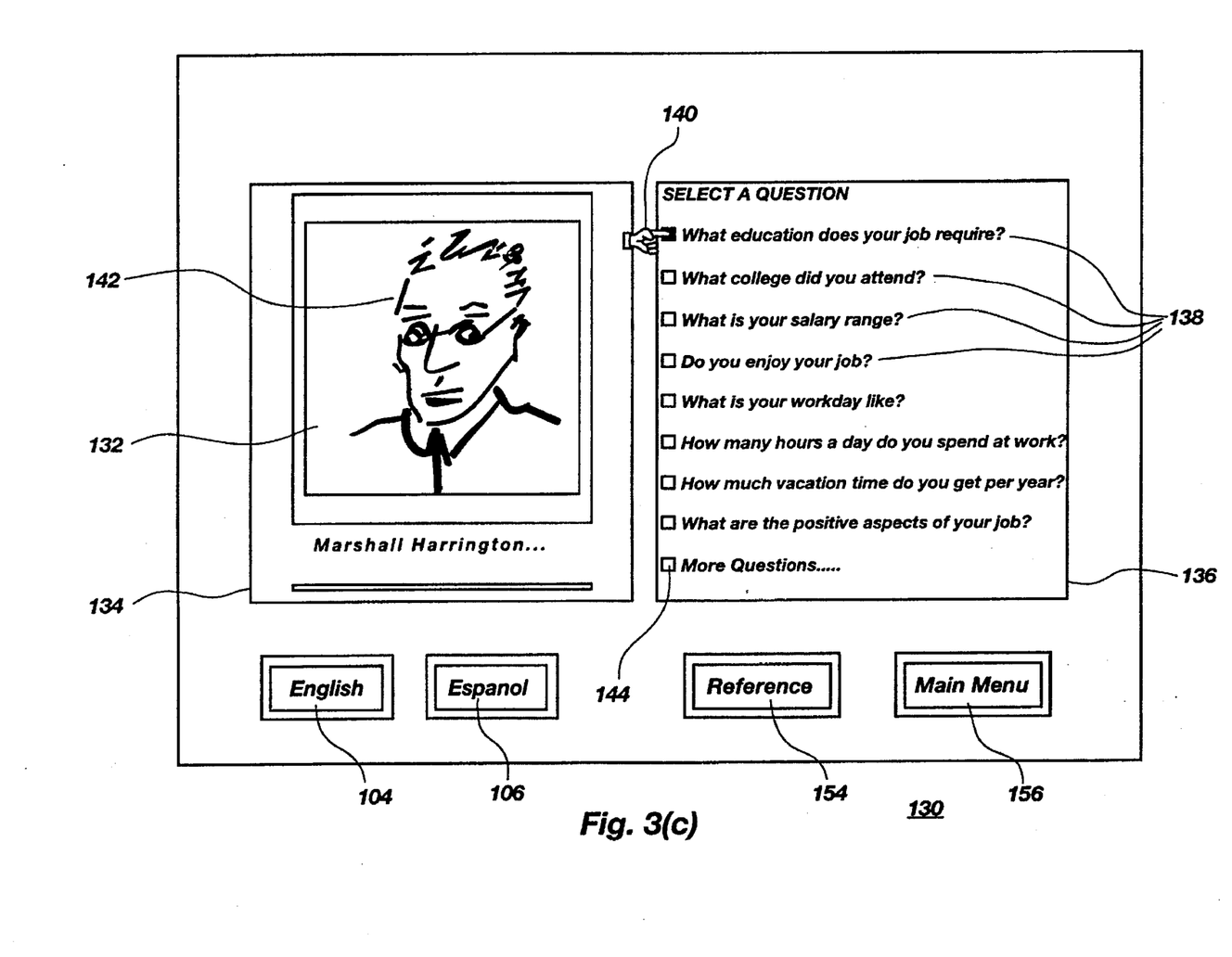

Once a particular career sub-file 122 has been selected, the program may then display a split screen 130 as shown in FIG. 3(c). On the left side 134 of the split screen 130 is a window 132 in which a person 142 being interviewed regarding a chosen career 122 is observed. In a preferred embodiment, the interviews are a digitized form of a videotaped interview with a person employed in that particular career or occupation. The interview is composed in a manner which gives the system user the sense of interviewing the person directly. The videotaped interview may be digitized in any manner known in the art, including MPEG compression technology.

On the right side 136 of the screen appears a list 138 of specific questions provided for the user to select from for response by the interviewee. Once a particular question 140 is selected, that portion of the program 40 or sub-file 122 is accessed which contains the interviewee's 142 response to the question 140. The user may select for response as many or as few questions as desired, and may move through the questions in any order. Multiple pages of questions may be selected by selecting the "MORE QUESTIONS" box 144 on the screen using a mouse or cursor.

The user may exit from a sub-file 122 and return to or re-access the career menu screen 110 at any time and select another career sub-file 120, or choose another field of interest with different career choices by inserting another compact disc 12. The user may also quit 112 the program. In doing so, the user can spend as much or as little time searching career information as desired, get detailed information from one or more careers, or ask specific questions from many different careers for comparison purposes. Thus, the user can tailor the program to obtain specific information.

Figure 3D:
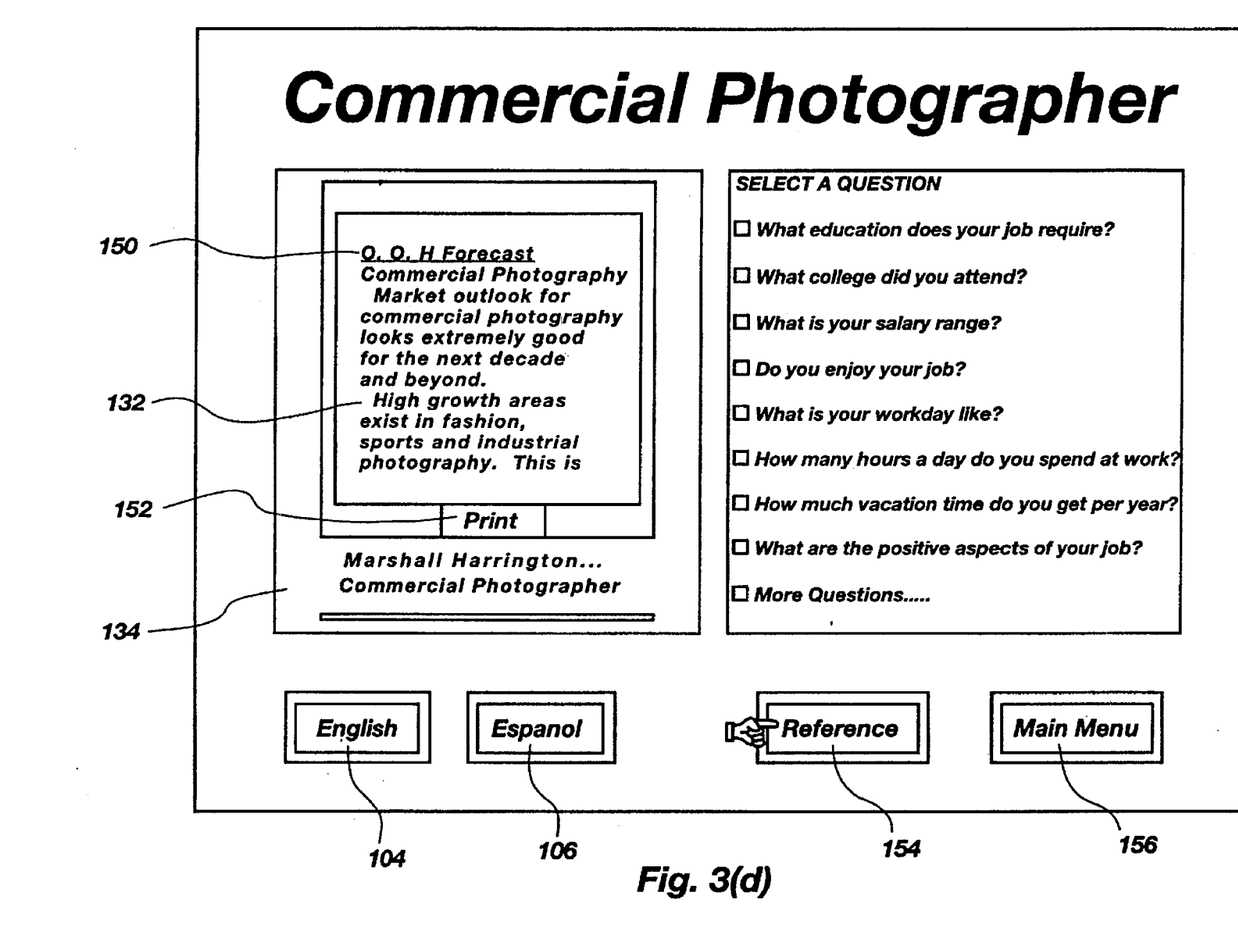

While the questions propounded to the interviewee may be of a more personal nature, the user may access more factual information encoded with each sub-file about a particular career or occupation, such as current market forecasts for hiring trends in a particular career. Thus, as shown in FIG. 3(d), the user may, by selecting the "REFERENCE" 154 box, replace the person 142 interviewed regarding a particular career 122 with text 150 provided from a database compiled, for example, from government resources on occupations, market forecast periodicals, and the like. The user may access written information that corresponds to a selected question 140 otherwise propounded to the interviewee, or to other questions relating more specifically to factual information about the career (hiring trends, etc.). The ability to select between an audible digitized interview and written or textual information is facilitated by encoding with the sub-file a field of data comprising the digitized interview and a field of data comprising the textual information. The structure and encoding of these fields within the sub-file is well-known in the art. While in the "REFERENCE" 154 mode, the user also has an option to download and print 152 the textual information by accession of conventional commands.

Throughout the operation of the program, the user has the option of selecting from between two or more preferred languages, including English 104. Thus, within each sub-file, a field of encoded data comprises the list of randomly selectable questions in the English language, and other fields may have encoded substantially the equivalent questions in other languages. Other encoded fields of data provide the textual information in English and other languages accordingly. Additionally, other fields of data are encoded with digitized audio voice-overs corresponding to the questions responded to by the interviewee. Selection of a language other than the default language of English queues the program to access the appropriate fields of data corresponding to questions, interview voice-over or textual information in the same language.

Figure 3E:
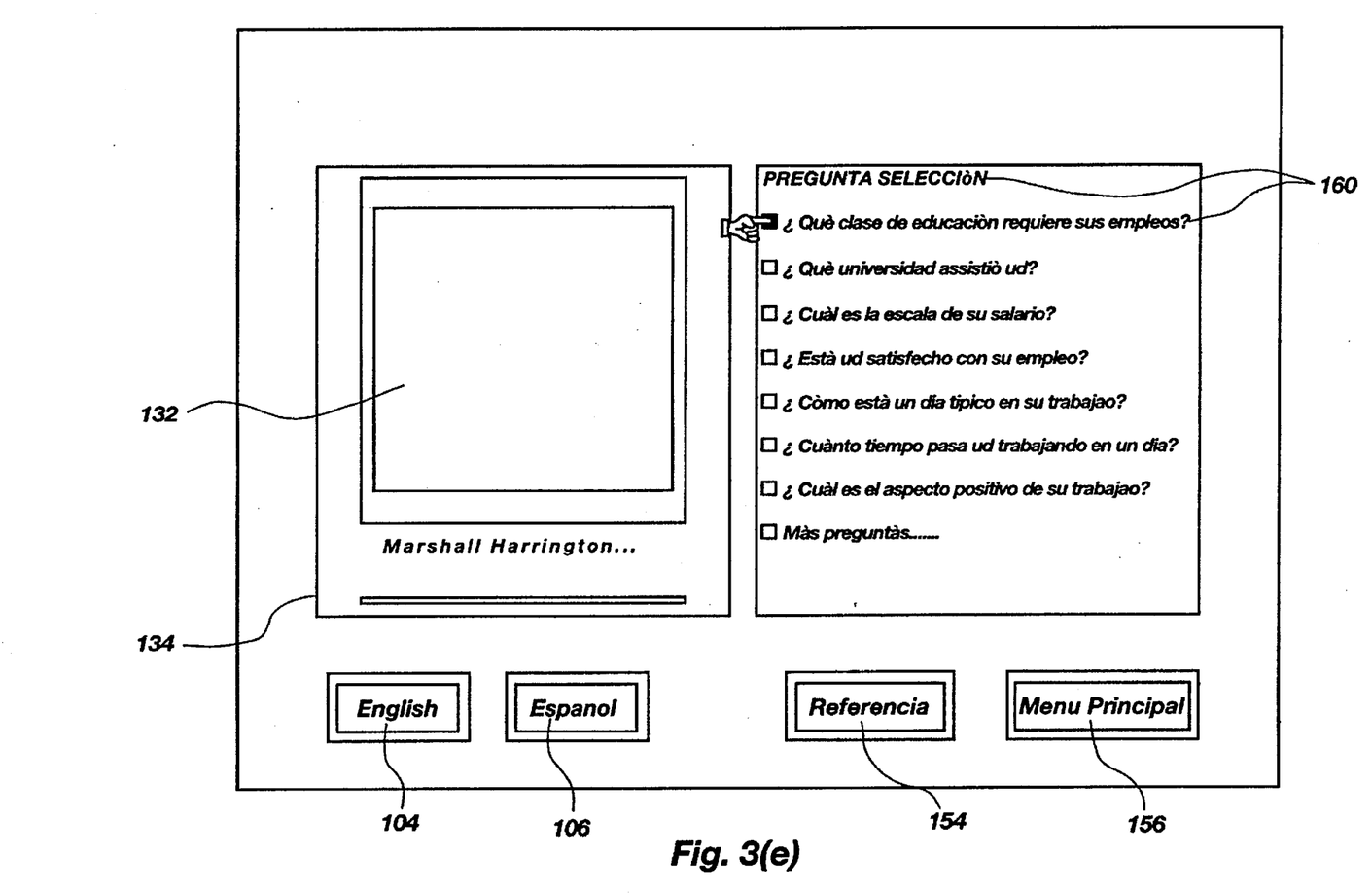

Spanish 106 may typically be a common alternative language choice, as well as Vietnamese, Chinese. German, Polish, Italian, or many others. if, for example, Spanish 106 is selected, as shown in FIG. 3(e), the textual information accessible through the "REFERENCE" 154 selection will appear in the Spanish language. If the user selects to propound questions to the interviewee 142 as described hereinabove, the user will see the questions appear in the newly selected language and will hear the interviewee respond to the question in the selected language. Thus, if Spanish is selected, the user will see the questions in Spanish and will hear the questions responded to in the Spanish language. Further, when a language other than English is selected, the function keys 102, 112, 154 and 156 appear in the newly selected language, as illustrated in FIG. 3(e).

The interactive means is also structured with fields of dan in various sub-files to permit heating-impaired persons to access the same information. One of the selectable language buttons may be, therefore, ASL (American Sign Language). When ASL is selected, the program will access from memory a super-imposed box to appear within the window 132 on the left-hand side of the split screen 130 and a person may be observed interpreting the interviewer's response in ASL. Alternatively, a box may appear at the bottom of the window 132 in which the response will appear in writing, similar to a subtitle.

The interactive means of the system may be further explained by referring to FIG. 2. The user inserts the disc 12 and starts the program 40. As shown, the user has the option throughout the program to choose a language 46 other than the one currently being used. The system is structured to default to English. Once initiated by selecting "BEGIN" 102, the program 40 accesses from memory a career menu screen 110. If a desired career 122 is not displayed on the career menu screen 110, the user may "QUIT" 112 the program and replace the disc 12 with another. If a desired career 122 is displayed in the menu, the user can select the career 122 by use of a mouse or cursor clicked on the desired career. At this point, the user can either continue or select another career 56 by going back to the careers menu screen 110. Once a career 122 has been selected the selected sub-file is accessed from memory and the split screen 130 will appear. The user may then chose a question 140 to be answered. The response to the question may be shown in text 150 by selecting "REFERENCE" 158 or may be responded to by a person 142. The system will automatically default to displaying the interviewee. In the "REFERENCE" 158 mode, the user has an option to print 152 the information. At this time, the user can either ask another question 54, go back to the careers menu screen 110 by selecting "MAIN MENU" 156, or quit by selecting "QUIT" 112 at the careers menu screen 110.

Accordingly, described herein is a system and method for interactively accessing career information by computer-generated or computer-aided means. In this approach, the user can selectively access information regarding career opportunities in a serf-directed and individualized manner. The interactive means of the present invention thus provides easy and quick access to career and occupational information precluding the need to access outside information or to personally contact individuals from particular career fields. Further, the interactive means presents an interesting and animated means for accessing the information.

The general system and means of providing easily and interactively accessed information relating to careers may be adapted in a variety of manners to suit the level of the user (e.g., junior high school children to college level adults), the type of information sought regarding various careers or occupations and the type of technology available, including multiple interface capabilities between various computer system compatibilities. Hence, reference herein to specific details of the illustrated embodiment is by way of example and not by way of limitation. It will be apparent to those skilled in the art that many additions, deletions, and modifications to the illustrated embodiments of the invention may be made without departing from the spirit and scope of the invention as defined by the claims which follow.

What is claimed is:

1. A system for selectively accessing a compilation of information relating to career and occupational opportunities which is stored in read only memory structure comprising:

means for initiating the accessing of information stored in read only memory relating to career and occupational opportunities, said means for initiating accessing providing a selectable first level of inquiry file comprising multiple sub-files each relating to a specific career or occupation;

means for opening one of said sub-files relating to a specific career or occupation responsive to a selection made at said first level of inquiry;

means for synchronously generating from said selected sub-file sequentially accessible fields of information, said fields of information comprising a first field containing a randomly selectable plurality of predetermined questions the selection of which is directed to elicit a response which is specific to the career or occupation of said sub-file to thereby provide specific information concerning said selected career or occupation, and a second field containing corresponding responses to said plurality of questions;

means for selecting at least one of said plurality of questions from said first field;

means for accessing from said second field of responses that portion of said responses in said second field which correspondingly responds specifically to said selection of at least one of said plurality of predetermined questions to provide specific information regarding the selected career or occupation; and means for closing said sub-file containing information relating to a single career or occupation.

2. The system of claim 1 wherein said second field of responses comprises a digitized version of a videotaped interview with a person employed in a particular career or occupation, said digitized version of said interview being stored in said sub-file of said read only memory.

3. The system of claim 2 wherein each said sub-file of information further includes a third field of information compiled from textual sources and formatted for providing responses to said plurality of questions of said first field, and said system further comprising means for selectively accessing either said second field of responses or said third field of textual information responses.

4. The system of claim 3 wherein each said sub-file further includes at least one additional field of randomly selectable plurality of questions corresponding in substantial exactitude to said first field of randomly selectable plurality of questions, except being presented in a language different than said plurality of questions in said first field, said system further comprising:

means for selectively accessing either said first field or said at least one additional field of randomly selectable plurality of questions;

means responsive to selection of said at least one additional field of randomly selectable plurality of questions for automatically accessing a fifth field of responses corresponding in substantial exactitude to said second field of responses except being in said language corresponding to said language of said at least one additional field of questions; and means responsive to selection of said at least one additional field of randomly selectable plurality of questions for automatically accessing a sixth field of information corresponding in substantial exactitude to said third field of information except being presented in a language corresponding to said language of said at least one additional field of questions.

5. The system of claim 4 further comprising means for formatting and queuing for printing a selected portion of information from said sixth field of information.

6. The system of claim 3 further comprising means for formatting and queuing for printing a selected portion of information from said third field of information.

7. A method of interactively accessing information relating to careers and occupations compiled in a computer-interfaceable structure comprising:

providing computer-interfaceable structure containing in read only memory a compilation of information relating to a plurality of career and occupations which provide the selection of a single career or occupation about which information may be accessed;

selectively accessing said compilation of information through menu-driven selections at multiple levels of inquiries, a first level of inquiry comprising a plurality of selectable files defining a collection of sub-files of careers and occupations; and selectively accessing from said at least one of said sub-files information relating to a specific career or occupation, said information including a plurality of randomly selectable questions the selection of which is directed to elicit a response which is specific to a specific career and a compilation of responses correspondingly responsive to said plurality of randomly selectable questions to provide specific information about said selected career or occupation.

8. The method of claim 7 further comprising the step of selecting from said first level of inquiry a sub-file containing information relating to a selected career or occupation.

9. The method of claim 8 further comprising the step of selecting for response from said selected sub-file at least one of said plurality of questions and obtaining responsive thereto a portion of said compilation of responses corresponding to said selected at least one of said plurality of questions.

10. The method of claim 9 further comprising the step of selecting to receive said response to said selected at least one of said plurality of questions in an audible form.

11. The method of claim 10 wherein said compilation of responses in said sub-file includes an interview of a person employed in the career or occupation which is the subject of said sub-file, said interview containing specific responses to said plurality of randomly selectable questions.

12. The method of claim 11 wherein said interview is a digitized version of a videotaped interview of human.

13. The method of claim 11 wherein said interview is a computer-generated image simulating an interview of a human, said computer-generated image being encoded on said computer-interfaceable structure.

14. The method of claim 11 further comprising the step of selecting to receive said response to said selected at least one of said plurality of questions in visualizable display format in American Sign Language.

15. The method of claim 9 further comprising the step of selecting for printing said response to said at least one of said plurality of questions relating to a selected career or occupation.

16. The method of claim 9 wherein said compilation of responses further includes information derived from written sources and selectively accessible in textual form.

17. The method of claim 16 further comprising the step of selectively printing said selectively accessible textual information.

18. The method of claim 16 further comprising the step of selecting to view said compilation of responses in either said audible or said textual form.

19. The method of claim 8 further comprising the step of selecting to access said compilation of information in a language other than English.

20. Interactive means for selectively accessing a compilation of information relating to one or more careers comprising:

computer-interfaceable structure containing a compilation of information relating to careers and occupations;

means for displaying in visual and audio form selected portions of said compilation of information enabling selective accession of said information; and means for selectively accessing said compilation of information through menu-driven selections at multiple levels of inquiries, a first level of inquiry comprising a selection of fields defining a collection of careers and occupations and a second level of inquiry comprising a selection of randomly selectable predetermined questions the selection of which elicit a response specific to a selected career or occupation by a person employed in said selected career or occupation.

* * * * *